US010248576B2

(12) United States Patent
Jin et al.

(10) Patent No.: US 10,248,576 B2
(45) Date of Patent: Apr. 2, 2019

(54) DRAM/NVM HIERARCHICAL HETEROGENEOUS MEMORY ACCESS METHOD AND SYSTEM WITH SOFTWARE-HARDWARE COOPERATIVE MANAGEMENT

(71) Applicant: HUAZHONG UNIVERSITY OF SCIENCE AND TECHNOLOGY, Wuhan, Hubei (CN)

(72) Inventors: Hai Jin, Hubei (CN); Xiaofei Liao, Hubei (CN); Haikun Liu, Hubei (CN); Yujie Chen, Hubei (CN); Rentong Guo, Hubei (CN)

(73) Assignee: HUAZHONG UNIVERSITY OF SCIENCE AND TECHNOLOGY, Wuhan, Hubei (CN)

( * ) Notice: Subject to any disclaimer, the term of this patent is extended or adjusted under 35 U.S.C. 154(b) by 167 days.

(21) Appl. No.: 15/287,022

(22) Filed: Oct. 6, 2016

(65) Prior Publication Data
US 2017/0277640 A1    Sep. 28, 2017

(30) Foreign Application Priority Data
Mar. 22, 2016    (CN) .......................... 2016 1 01662380

(51) Int. Cl.
*G06F 12/10* (2016.01)
*G06F 12/1045* (2016.01)
*G06F 12/0862* (2016.01)

(52) U.S. Cl.
CPC ...... *G06F 12/1054* (2013.01); *G06F 12/0862* (2013.01); *G06F 2212/1024* (2013.01);
(Continued)

(58) Field of Classification Search
CPC ............. G06F 12/1027; G06F 12/1009; G06F 2212/68; G06F 12/1054; G06F 12/1045;
(Continued)

(56) References Cited

U.S. PATENT DOCUMENTS

2014/0089598 A1\* 3/2014 DeBruyne ........... G06F 9/30149
711/140

\* cited by examiner

*Primary Examiner* — Reginald G Bragdon
*Assistant Examiner* — Thanh D Vo
(74) *Attorney, Agent, or Firm* — Hamre, Schumann, Mueller & Larson, P.C.

(57) ABSTRACT

The present invention provides a DRAM/NVM hierarchical heterogeneous memory system with software-hardware cooperative management schemes. In the system, NVM is used as large-capacity main memory, and DRAM is used as a cache to the NVM. Some reserved bits in the data structure of TLB and last-level page table are employed effectively to eliminate hardware costs in the conventional hardware-managed hierarchical memory architecture. The cache management in such a heterogeneous memory system is pushed to the software level. Moreover, the invention is able to reduce memory access latency in case of last-level cache misses. Considering that many applications have relatively poor data locality in big data application environments, the conventional demand-based data fetching policy for DRAM cache can aggravates cache pollution. In the present invention, an utility-based data fetching mechanism is adopted in the DRAM/NVM hierarchical memory system, and it determines whether data in the NVM should be cached in the DRAM according to current DRAM memory utilization and application memory access patterns. It improves the efficiency of the DRAM cache and bandwidth usage between the NVM main memory and the DRAM cache.

8 Claims, 8 Drawing Sheets

(52) U.S. Cl.
CPC .... *G06F 2212/202* (2013.01); *G06F 2212/22* (2013.01); *G06F 2212/602* (2013.01); *G06F 2212/68* (2013.01)

(58) Field of Classification Search
CPC . G06F 12/10; G06F 2212/684; G06F 2212/65
See application file for complete search history.

FIG. 1

| P 1bit | R/W 1bit | U/S 1bit | 00 | A 1bit | D 1bit | 00 | AVAIL 1bit | Page frame address | a) Current last-level page table entry structure of a computer

| P 1bit | R/W 1bit | U/S 1bit | PD 1bit | 0 | A 1bit | D 1bit | 00 | AVAIL 1bit | Page frame address | *overlap field* | b) Extended last-level page table entry structure

DRAM/NVM HIERARCHICAL HETEROGENEOUS MEMORY ACCESS METHOD AND SYSTEM WITH SOFTWARE-HARDWARE COOPERATIVE MANAGEMENT

TECHNICAL FIELD

The present invention belongs to the field of cache performance optimization in a DRAM/NVM heterogeneous memory environment, and in particular, a DRAM/NVM hierarchical heterogeneous memory access method and system with software-hardware cooperative management schemes are designed, and an utility-based data fetching mechanism is proposed in this system.

BACKGROUND ART

With the development of the multi-core and multi-threading technology, Dynamic Random Access Memory (DRAM) can no longer meet the growing memory demand of applications due to restrictions in terms of power consumption and techniques. Emerging Non-Volatile Memories (NVMs), such as Phase Change Memory (PCM), Spin Transfer Torque Magneto resistive Random Access Memory (STT-MRAM), and Magnetic Random Access Memory (MRAM), have features such as byte-addressable, comparable read speed with DRAM, near-zero standby power consumption, high density (storing more data per chip), and high scalability, and may serve as a substitute for DRAM as the storage medium of main memory. However, compared with the DRAM, these new non-volatile memories still have a lot of disadvantages: (1) a relatively high read/write delay, where the read speed is approximate twice slower than that of DRAM, and the write speed is almost five times slower than that of the DRAM; (2) high write power consumption; and (3) a limited endurance life. Therefore, it is unfeasible to directly use these emerging non-volatile memories as the computer main memory. A mainstream approach at present is to integrate a large amount of non-volatile memories with a small amount of DRAMs to form a heterogeneous memory system, so that the performance, power efficiency and endurance of the memory system are improved by exploiting the advantage of large capacity of the non-volatile memory and the advantages of a low memory access delay, low write power consumption, and high endurance of the DRAM.

There are mainly two types of heterogeneous memory architectures at present: flat and hierarchical heterogeneous memory architectures.

In a heterogeneous memory system with a flat architecture, the NVM and the DRAM are uniformly addressable, and both NVM and DRAM are used as main memory. To improve the power efficiency and performance of the system, hot page migration is a common optimization policy adopted in this architecture. That is, frequently accessed NVM page frames are migrated to the DRAM. A migration operation is generally divided into two sequential steps: (1) copying the content of source and target page frames into a buffer; and (2) writing the data in the buffer into target addresses. Therefore, one page migration operation may generate four times of page replication, and thus the time cost of the migration operations are relatively large because the reading phase and the writing phase are performed sequentially. Besides, if a memory system supports 2 MB or 4 MB superpage to reduce TLB miss rate, the hot page migration mechanism can leads to tremendous time and space overhead.

In a heterogeneous memory system with a hierarchical architecture, high-performance memories such as DRAM are used as a cache to the non-volatile memory. As memory access to DRAM cache is more efficient than that of NVM, a heterogeneous memory system with a hierarchical architecture can achieve better application performance compared with the heterogeneous memory system with a flat architecture. In a conventional hierarchical heterogeneous memory system, a DRAM cache is managed by hardware and is transparent to operating systems, and the organization of the DRAM cache is similar to a conventional on-chip cache. When a LLC miss occurs, the hardware circuit in DRAM memory controller is responsible for tag lookup of a physical page address. It determines whether data access is hit in the DRAM cache, and then performs actual data access. This implies that the hierarchical heterogeneous memory system has a relatively long access delay when a DRAM cache miss occurs. In addition, the hardware-managed DRAM cache generally adopts a demand-based data fetching mechanism. When data is not hit in DRAM cache, the NVM data block corresponding to the missing data should be fetched into DRAM cache first and then is loaded to on-chip last-level cache. In big data environments, a lot of applications have poor temporal/spatial locality, and such data fetching mechanism would aggravate cache pollution.

SUMMARY

In view of the disadvantages of the prior techniques, the present invention provides a DRAM/NVM hierarchical heterogeneous memory system with software-hardware cooperative management, which is aimed at eliminating large hardware costs and reducing memory access delay in a conventional hierarchical heterogeneous memory system. Moreover, DRAM cache can be managed in a more flexible manner by software, and thus the DRAM cache utilization and memory access throughput between NVM and DRAM are improved. In a hardware view, the data layout of Translation Lookaside Buffer (TLB) is modified in the present invention. In a software view, the data structure of current page table is extended to support a mapping from NVM pages to DRAM pages. Furthermore, an utility-based data fetching policy is designed to improve the utilization of DRAM cache and bandwidth usage between NVM main memory and DRAM cache.

To achieve the aforementioned objectives, a hardware-managed DRAM/NVM hierarchical memory access method is provided, including:

step 1: address translation in TLB: acquiring the physical page number (ppn), the P flag, and content of the overlap tlb field from an TLB entry which corresponds to a virtual page number (vpn), and translating the virtual address into an NVM physical address according to the ppn;

step 2: determining whether memory access is hit in the on-chip cache; directly fetching, by a CPU, a requested data block from the on-chip cache if the memory access is hit, and ending a memory access process; otherwise, turning to step 3;

step 3: determining a memory access type according to the P flag acquired in step 1; if P is 0, which indicates access to an NVM memory, turning to step 4, updating information of the overlap tlb field (where the field is used as a counter in this case) in the TLB entry, and determining, whether the NVM physical page corresponding to the virtual page should be fetched into the DRAM cache according to the fetching threshold in the dynamic threshold adjustment algorithm and the overlap tlb field acquired in step 1.

Otherwise, if P is 1, which indicates access to a DRAM cache and indicates that the cache is hit, calculating the physical address of the to-be-accessed DRAM cache according to the information of the overlap tlb field acquired in step 1 and the offset of virtual address, and turning to step 6 to access the DRAM cache;

step 4: looking up the TLB for an entry corresponding to an NVM main memory page if the value of the overlap tlb field acquired in step 1 is less than the fetching threshold, and increasing the value of overlap tlb field (where the field is used as a counter in this case) of the TLB by one, go to step 6 to directly access the NVM memory, where the fetching threshold is determined by a fetching threshold runtime adjustment algorithm; if the value of the overlap tlb field acquired in step 1 is greater than the fetching threshold, go to step 5 to fetch the NVM main memory page into the DRAM;

step 5: prefetching the NVM page corresponding to the virtual address into the DRAM cache, and updating the TLB and the extended page table; and step 6: memory access: accessing the NVM page according to the physical address delivered to the memory controller.

According to another embodiment of the present invention, a software-managed DRAM/NVM hierarchical heterogeneous memory system is provided, including modified TLB layout, extended page table, and a utility-based data fetching module, where:

the modified TLB is used to cache the address mapping of virtual-to-NVM and also virtual-to-DRAM. This mechanism improves the efficiency of address translation. In addition, some reserved bits in TLB is further used to record page access frequency of applications, so as to assist the utility-based data fetching module for decision making;

the extended page table stores all mapping from virtual pages to physical pages and mapping from NVM pages to DRAM cache pages, where a PD flag is used to indicate the type of a page frame recorded in a page table entry; and the utility-based data fetching module is used to replace the demand-based data fetching policy in a conventional hardware-managed cache. The module mainly includes three sub-modules: a memory monitoring module, a fetching threshold runtime adjustment module, and a data prefetcher:

(1) the memory monitoring module is used to acquire DRAM cache utilization and NVM page access frequency from the modified TLB and memory controller, and use them as input information for data fetching threshold runtime adjustment module; (2) the fetching threshold runtime adjustment module is used to dynamically adjust the data fetching threshold according to the runtime information provided by the memory monitoring module, to improve DRAM cache utilization and bandwidth usage between the NVM and the DRAM; (3) the data prefetcher is used to: ① trigger a buddy allocator of the DRAM cache management module to allocate a DRAM page for caching a NVM memory page; ② copy content of the NVM memory page to the DRAM page allocated by the buddy allocator; and ③ update the extended page table and the TLB.

In general, compared with the previous techniques, the present invention have the following advantages:

(1) The system modifies the TLB data structure and extends the page table, which enable uniform management of DRAM cache pages and NVM main memory pages, and eliminates hardware costs in a conventional DRAM/NVM hierarchical memory system while reducing memory access delay.

(2) The system monitors memory accesses using some TLB reserved bits, and eliminates huge hardware costs compared with the conventional DRAM/NVM heterogeneous memory system that monitors the page access frequency in the memory controller.

(3) The system develops a utility-based cache fetching method, and a dynamic fetching threshold adjustment algorithm is designed to dynamically adjust the fetching threshold according to application memory access locality and utilization of the DRAM cache, which improves utilization of the DRAM cache and bandwidth usage between the NVM main memory and the DRAM cache.

DETAILED DESCRIPTION

To illustrate the objectives, technical solutions and advantages of the presented invention more clearly, the following further describes the details of this invention with figures and case studies. It should be noted that, the specific cases described in this invention are only used to illustrate the present invention rather than limiting the application scenarios of this invention.

Figure 1:
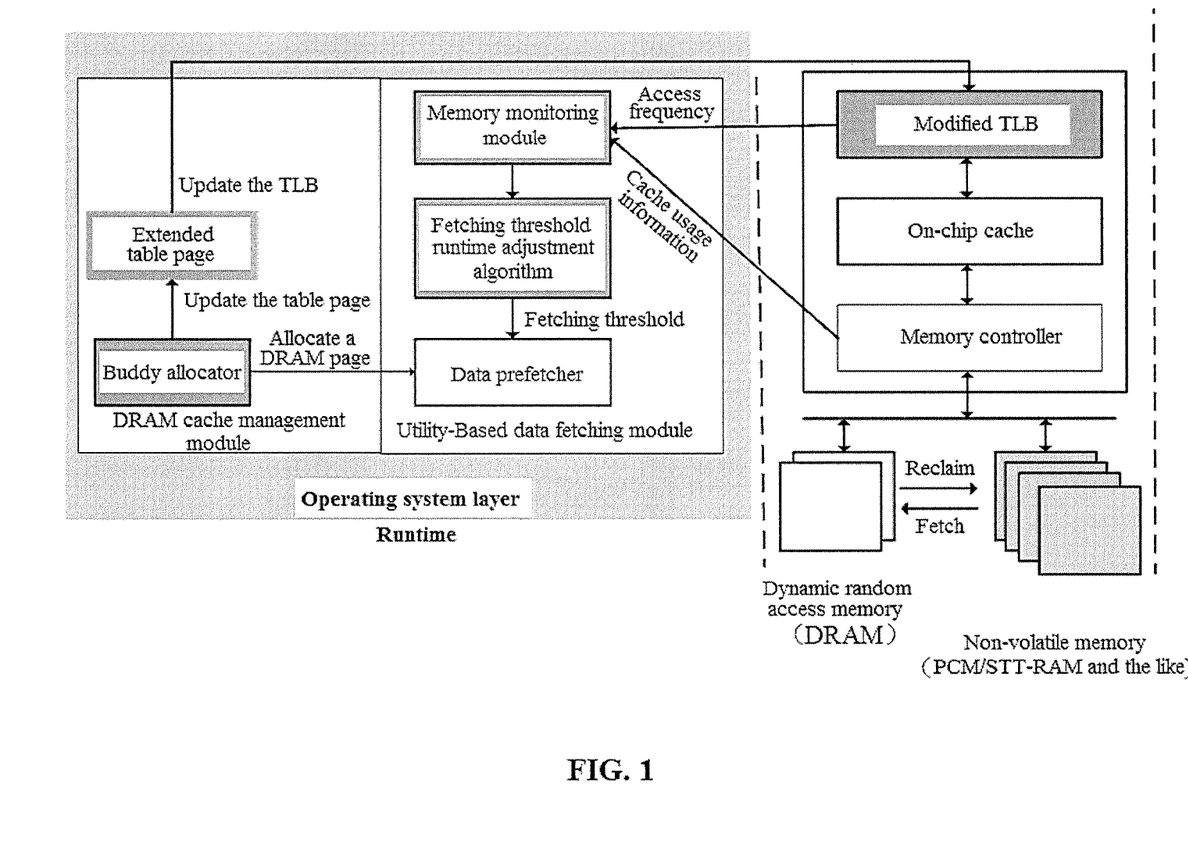
FIG. 1 is a structural diagram of a DRAM-NVM hierarchical heterogeneous memory system with software-hardware cooperative management according to the present invention.

FIG. 1 shows system architecture of a DRAM/NVM hierarchical heterogeneous memory system with software-hardware cooperative management. The hardware layer includes a modified TLB, and the software layer includes extended page table, a utility-based data fetching module, and a DRAM cache management module. The extended page table is mainly used to manage the mapping from virtual pages to physical pages and the mapping from NVM memory pages to DRAM cache pages. The modified TLB caches page table entries that are frequently accessed in the extended page table, thereby improve the efficiency of address translation. In addition, some reserved bits in the modified TLB is further used to record access frequency of NVM memory pages, and to assist the utility-based data fetching module in data fetching operations. The utility-based data fetching module is mainly used to cache the NVM page in the DRAM, and it includes three sub-modules: a memory monitoring module, a fetching threshold runtime adjustment module, and a data fetcher, where the memory monitoring module is used to collect page access frequency information and cache utilization from the TLB and memory controller, respectively; the fetching threshold runtime adjustment module dynamically adjusts the page fetching threshold according to the information collected by the memory monitoring module. When access frequency of a NVM memory page is greater than the threshold, the data fetcher is invocated to cache the NVM page into the DRAM. The DRAM cache management module is mainly used to manage the DRAM cache, and mainly includes a buddy allocator sub-module. When a NVM page needs to be cached into the DRAM, the buddy allocator allocates a DRAM page to load the content of the NVM page according to a buddy allocation algorithm, and meanwhile updates the extended page table to set up a mapping from the NVM page to the DRAM page, so that the DRAM page can be written back to the corresponding NVM page when the DRAM page is reclaimed.

Figure 2:
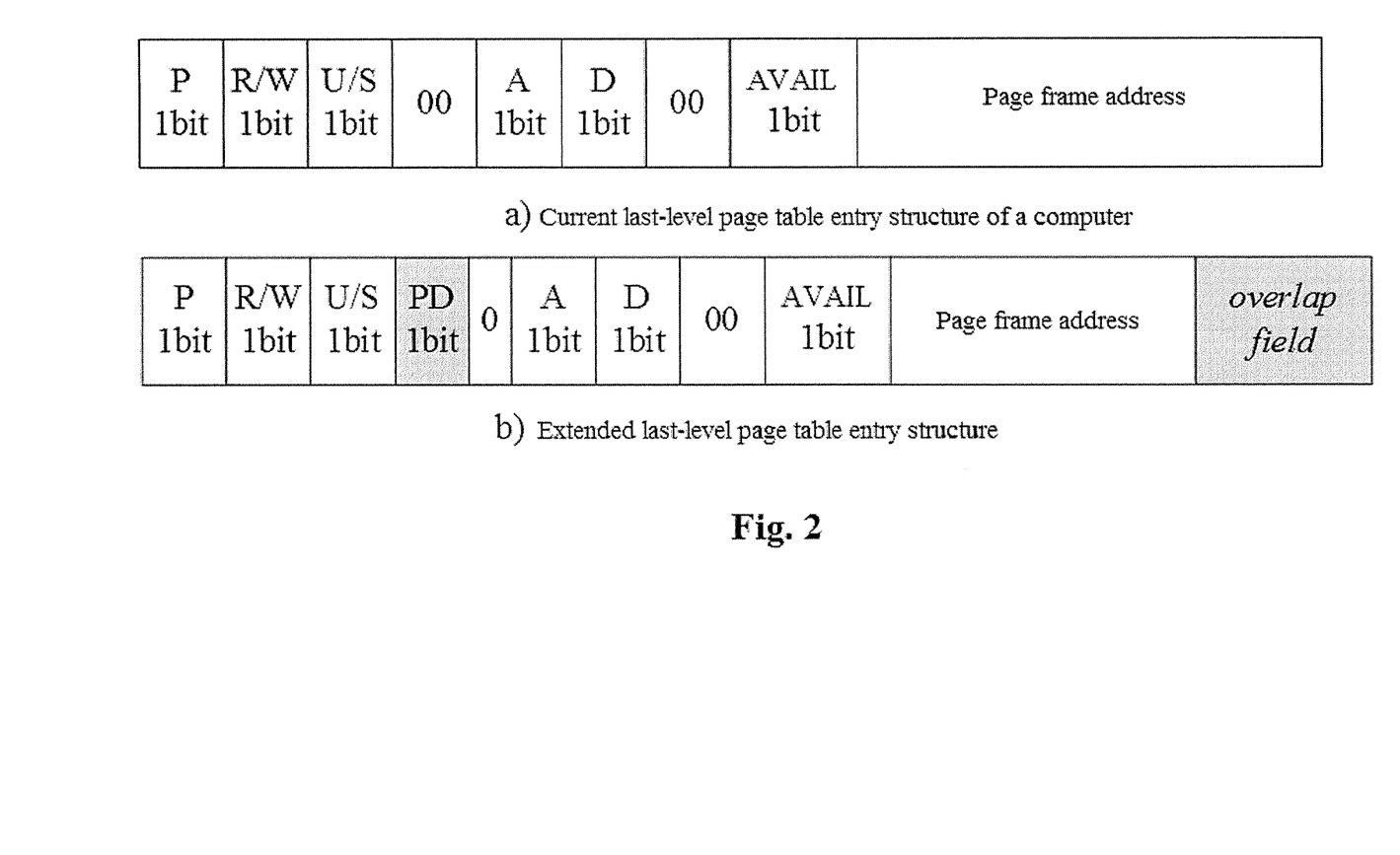
FIG. 2 shows last-level page table entry structures before and after extension according to the present invention.

To push the management of DRAM cache to the software level, in the present invention, DRAM cache and NVM are uniformly managed in a flat physical address space, and the data structure of last-level page table is extended, as shown in FIG. 2. A conventional page table entry generally includes flags such as P, R/W, U/S, D, and AVAIL, where the P flag indicates whether a page recorded in the page table entry has been fetched into the memory; the R/W flag records an read/write operation permission on the page recorded in the page table entry, where R represents that read is allowed, and W represents that write is allowed; the U/S flag indicates whether the page recorded in the page table entry is a user mode page frame or a kernel mode page frame; the D flag is used to record whether any data has been written into the page corresponding to the entry. On the basis of a conventional page table, a PD flag bit and an overlap field are added to the last-level page table entry after extension. The PD flag (1 bit) indicates the medium type of a physical page frame corresponding to a virtual page frame. When PD is 0, it indicates that the physical page frame corresponding to the virtual page frame is an NVM main memory; and when PD is 1, it indicates that the physical page frame corresponding to the virtual page frame has been fetched from the NVM main memory into the DRAM cache. The overlap field records different content according to different PD flags: when PD is 0, the field is used as a counter and records the number of memory accesses to the page referenced by the page table entry; and when PD is 1, the field records the physical address of a DRAM page corresponding to an NVM page, thereby establishing a mapping from the NVM page to the DRAM page.

Figure 3:
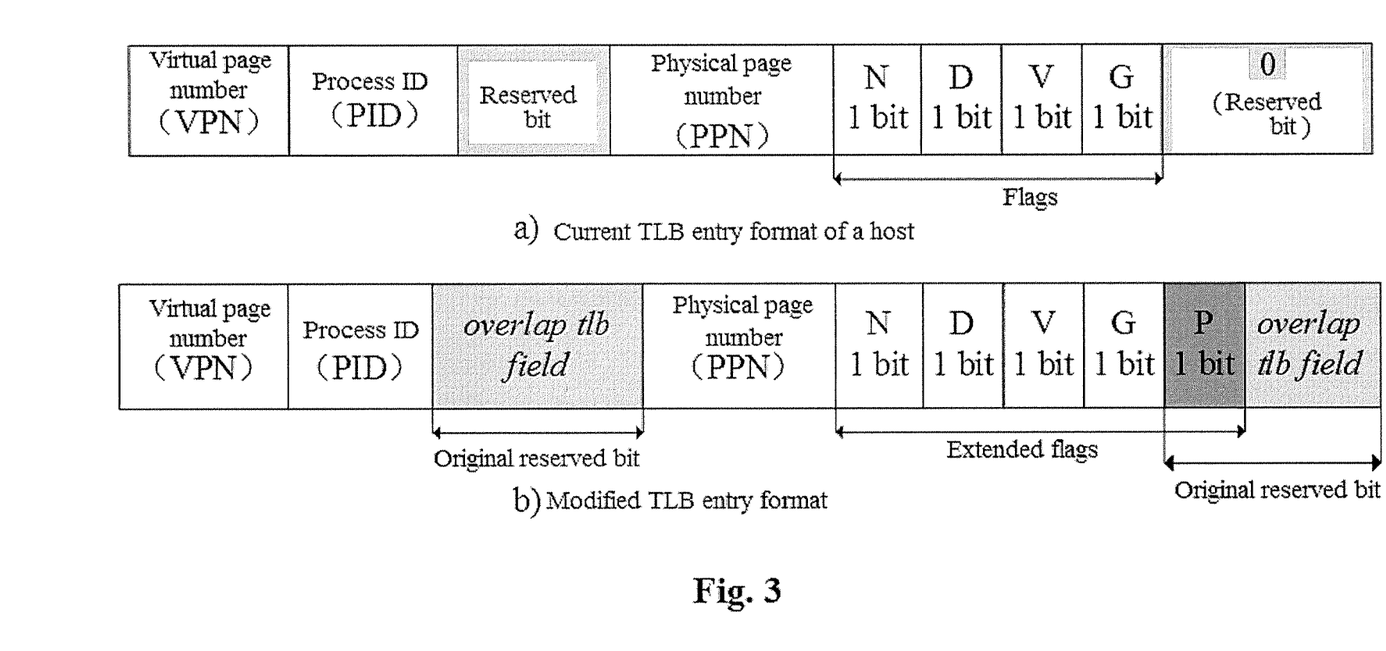
FIG. 3 shows TLB entry structures before and after modification according to the present invention.

The TLB, as one of the most important hardware in a computer system, eliminates most of page table walk overheads by caching the recently accessed page table entries, and thus significantly improve the efficiency of translation from a virtual address to a physical address. In this invention, some reserved bits of the TLB entry are used to extend the data structure a TLB entry, so that a TLB entry can cache an extended page table entry, as shown in FIG. 3. On the basis of the current data structure of the TLB entry, a P flag bit and an overlap tlb field are added in the extended TLB entry. Similar to the PD flag in the page table entry, the P flag is used to indicate the medium type of a physical page frame corresponding to a virtual page frame recorded in the TLB entry. When P is 0, it indicates that the TLB entry records the mapping from a virtual page to a NVM physical page, and the overlap tlb field is used to record the number of memory accesses to a page referenced by a TLB entry. When P is 1, it indicates that the physical page recorded in the TLB entry has been fetched from the NVM main memory into the DRAM cache, and the overlap tlb field records the DRAM page number corresponding to the NVM page.

Figure 4:
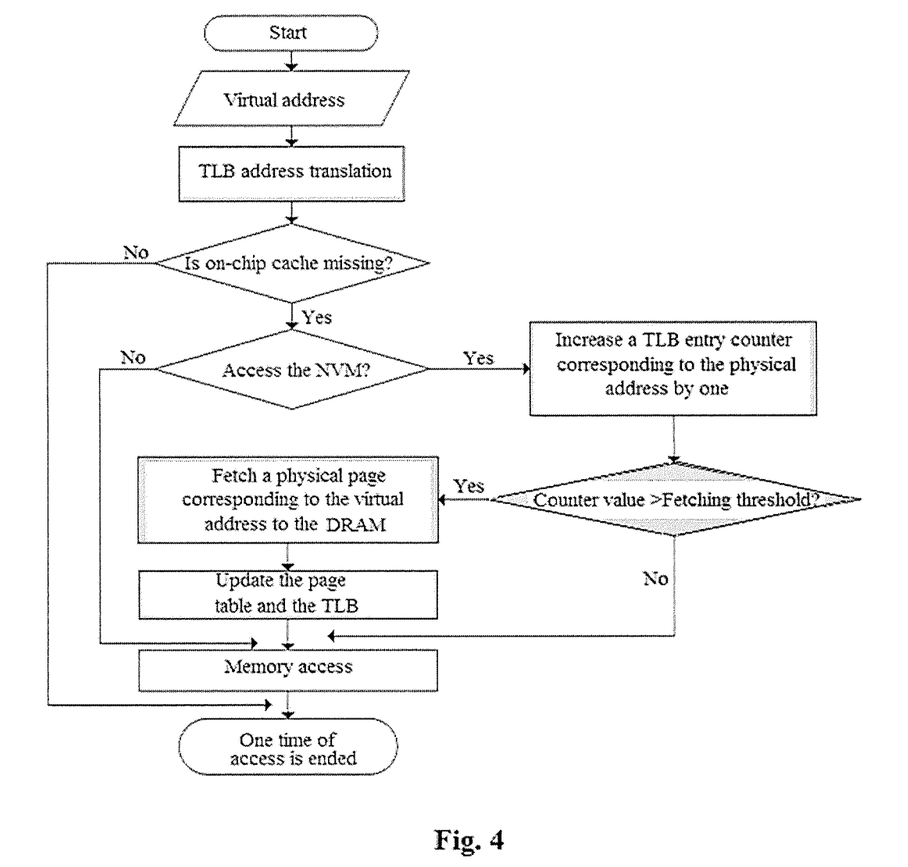
FIG. 4 is a working flow chart of a DRAM-NVM heterogeneous memory system according to the present invention.
Figure 5:
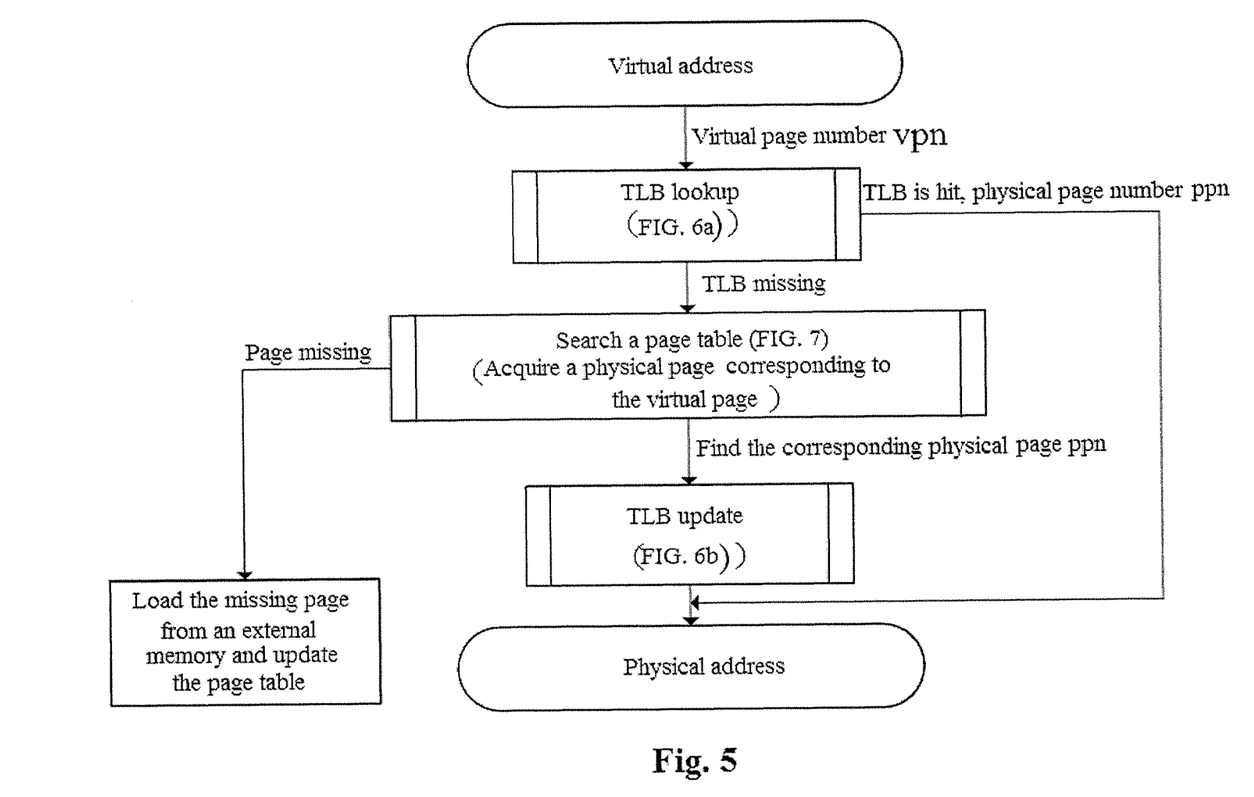
FIG. 5 is a flow chart of translation from a virtual address to a physical address in a DRAM-NVM hierarchical heterogeneous memory system according to the present invention.
Figure 6:
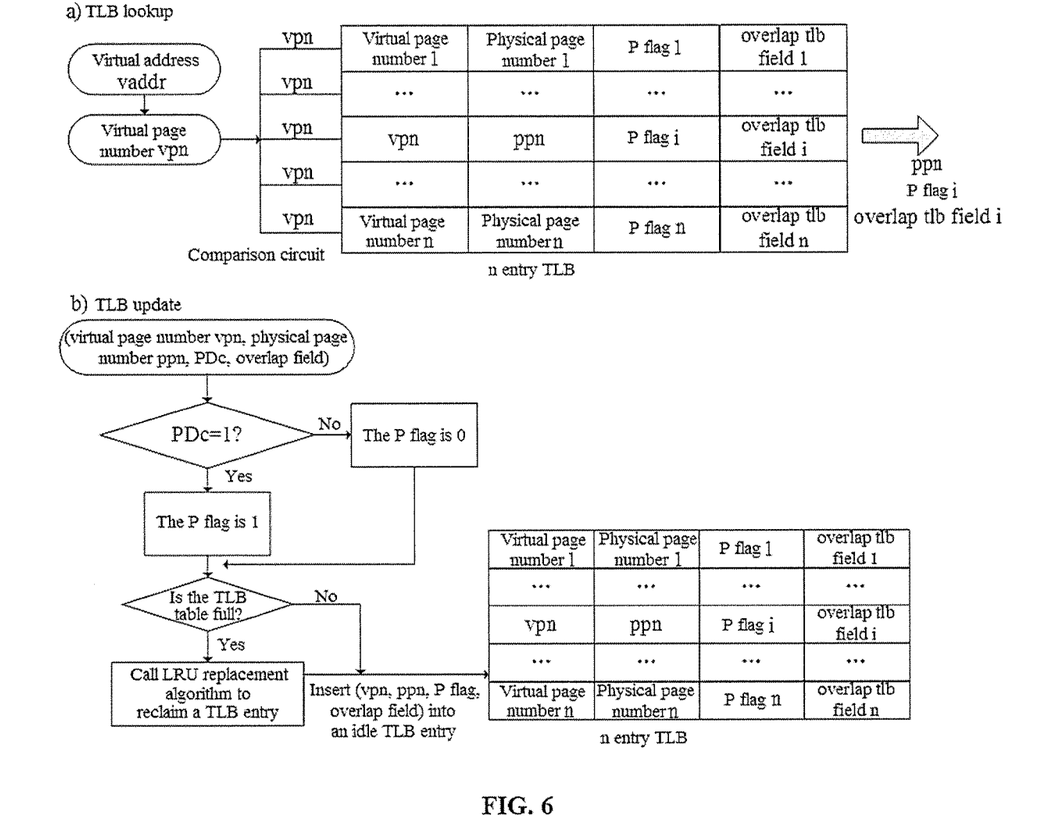
FIG. 6 is a flow chart of TLB lookup and update in a DRAM-NVM hierarchical heterogeneous memory system according to the present invention.

FIG. 4 is a working flow chart of a DRAM-DRAM hierarchical heterogeneous memory system with software-hardware cooperative management according to the present invention, where specific steps are as follows:

Step 1: TLB address translation: acquire the physical page number ppn, the P flag, and content of the overlap tlb field in a TLB entry which corresponds to a virtual page, and translate the virtual address into an NVM physical address according to the ppn. As shown in FIG. 5, step 1 specifically includes the following sub-steps:

(1-1) TLB lookup: Look up the TLB entry by using a virtual page number as the keyword, to acquire a physical page number ppn, a P flag bit and content of an overlap tlb field corresponding to the virtual page number, as shown in FIG. 6a).

Figure 7:
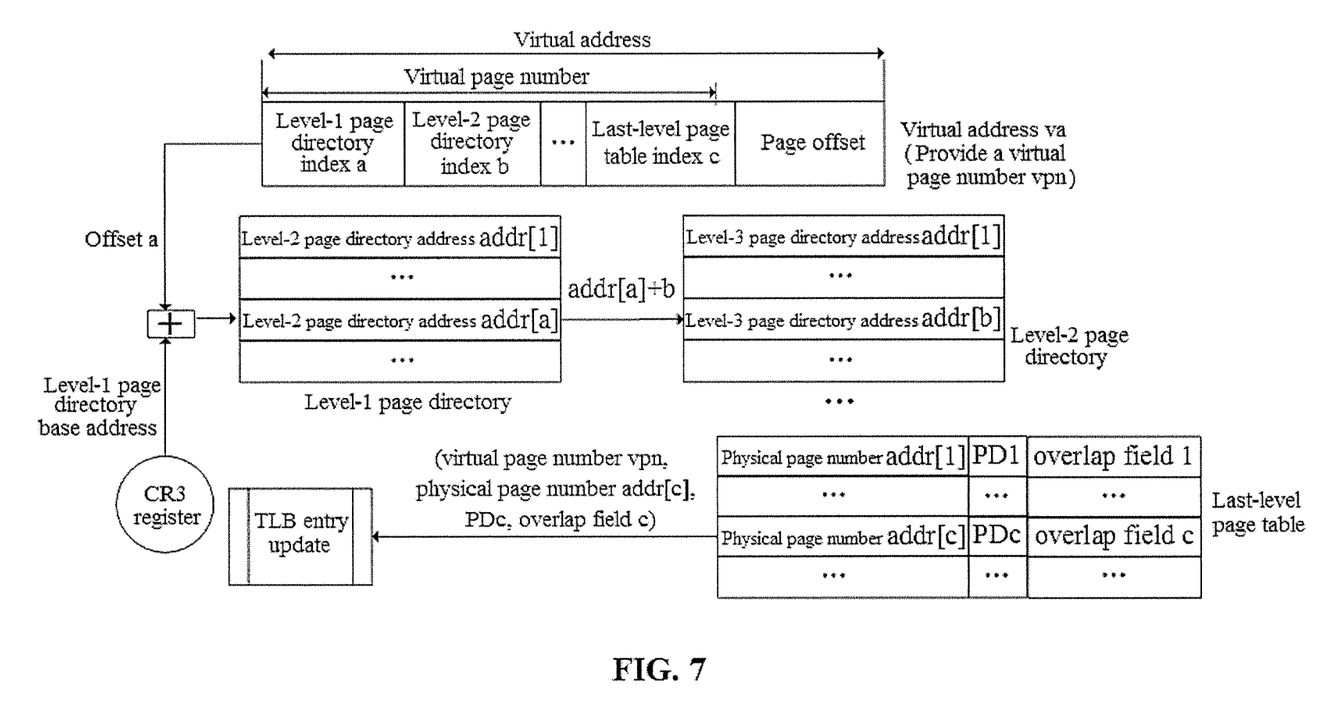
FIG. 7 is a flow chart of page table query in a DRAM-NVM hierarchical heterogeneous memory system according to the present invention.

(1-2) If an entry corresponding to the virtual address is found in the TLB, that is, the TLB is hit, acquire the physical page number corresponding to the virtual page, translate the virtual address into physical address, and go to step 2 to access an on-chip cache by using the physical address; otherwise, i.e., the TLB is missing, and a page table walk is needed. This process is similar to a page table walk process in conventional architectures, as shown in FIG. 7. It includes the following detailed steps:

(1-2-1) Acquire the base address of level-1 page table by using the CR3 register; acquire the index a of level-1 page directory according to the virtual address, and add the index a to the base address of level-1 page table to calculate the base address of level-2 page directory.

(1-2-2) Access the entry in level-1 page directory according to the address obtained in (1-2-1) and acquire the base address of level-2 page directory addr[a]. Add addr[a] to index b of the level-2 page directory to calculate the base address of level-3 page directory.

(1-2-3) Repeat this process till a last-level page table is accessed. If the entry corresponding to the virtual address is valid, acquire the corresponding physical page number addr [c], the flag PDc which indicates the storage medium type of a page frame (when PDc is 1, meaning that the page frame is in DRAM, otherwise the PDc is 0, meaning that the page frame is in NVM), and content of an overlap field; otherwise the accessed entry is invalid, load the missing page into the NVM main memory from the external storage, update the page table, and then go to (1-2-4) to update the TLB.

(1-2-4) TLB update: insert a TLB entry which sets up a mapping from the virtual address to the physical address (virtual page number vpn, physical page number addr [c], PDc, and overlap field c) into the TLB, as shown in FIG. 6(b). The TLB update mainly includes the following two sub-steps:

(1-2-4-1) If PDc is 0, which indicates that the physical page corresponding to the virtual page is an NVM page, set the P flag of the TLB entry to 0; otherwise, the physical page corresponding to the virtual page is a DRAM page, and the P flag of the TLB entry is set to 1.

(1-2-4-2) If the TLB table has free space, create a new entry and insert (virtual page number vpn, physical page number addr[c], PDc, overlap field) into the new TLB entry, where the overlap field corresponds to the overlap tlb field in the TLB; If the TLB table is full, reclaim a TLB entry using LRU replacement algorithm, and then install a new TLB entry.

Step 2: Determine whether the memory access is hit in the on-chip cache, directly fetch, by a CPU, a requested data block from the on-chip cache if the memory access is hit, and end the memory access process; otherwise, turn to step 3;

step 3: determine the storage medium of memory access according to the P flag acquired in step 1; if P is 0, which indicates an NVM page access, and go to step 4, updating information of the overlap tlb field (where the field is used as a counter in this case) in the TLB entry, and determine whether the NVM physical page corresponding to the virtual page should be fetched into the DRAM cache according to the fetching threshold in the dynamic threshold adjustment algorithm and the overlap tlb field acquired in step 1. Otherwise, if P is 1, this indicates a DRAM page access and the cache is hit, and then the physical address of the to-be-accessed DRAM cache is obtained according to the overlap tlb field acquired in step 1 and the offset of virtual address, and go to step 6 to access the DRAM cache;

step 4: Look up the TLB for an entry corresponding to an NVM main memory page if the value of the overlap tlb field acquired in step 1 is less than the fetching threshold, and increase the value of overlap tlb field (where this field is used as a counter in this case) in the TLB by one, go to step 6 to directly access the NVM memory, where the fetching threshold is determined by a fetching threshold runtime adjustment algorithm; if the value of the overlap tlb field acquired in step 1 is greater than the fetching threshold, go to step 5 to fetch the NVM main memory page into the DRAM; The fetching threshold runtime adjustment algorithm includes the following sub-steps:

(4-1) Acquire, by a memory monitoring module, the number of NVM page fetching times $n_{fetch}$, the number of cache read times $n_{dram\_read}$, and the number of cache write times $n_{dram\_write}$ from the memory controller. Assume the average read and write latencies of the NVM are $t_{nvm\_read}$ and $t_{nvm\_write}$, respectively, the average read and write latencies of the DRAM are $t_{dram\_read}$ and $t_{dram\_write}$, respectively, and the overhead of caching a DRAM page is $t_{fetch}$. and calculates, every $10^9$ clocks by using formula 4.1, a performance gain benefited from caching NVM page to DRAM in every $10^9$ clocks:

$$\text{benefit}_t = n_{dram\_read} \times (t_{nvm\_read} - t_{dram\_read}) + n_{dram\_write} \times (t_{nvm\_write} - t_{dram\_write}) - n_{fetch} \times t_{fetch} \quad \text{(Formula 4.1)}$$

(4-2) Assume that the initial fetching threshold is fetch_thres$_0$ (fetch_thres$_0 \geq 0$), the fetching threshold and performance gain in the previous $10^9$-clock period are fetch_thres$_{t-1}$ and benefiet$_{t-1}$, respectively, and the fetching threshold and the performance gain of current $10^9$-clock period are fetch_thres$_t$ and benefiet$_t$, respectively, and the cache utilization is dram_usage. Adjust the prefetching threshold by using a hill climbing algorithm if dram_usage>30%, which mainly includes the following sub-steps:

4-2-1) If it is the first time adjusting the threshold, calculate the performance gain under the given fetching threshold. If benefiet$_t \geq 0$ it indicates that data block fetching can improve system performance, and if fetch_thres$_0$>0, fetch_thres$_t$=fetch_thres$_0$−1; otherwise benefiet$_t$<0, it indicates that data block fetching may decrease system performance, fetch_thres$_t$=fetch_thres$_0$+1. If it is not the first time adjusting the threshold, go to the next step;

4-2-2) If benefiet$_t$>benefiet$_{t-1}$, it indicates that the fetching threshold adjusting method used in the previous $10^9$-clock period is able to improve the system performance, and the threshold adjusting method is kept the same as the action in the previous $10^9$-clock period. That is, if the fetching threshold is decreased in the previous $10^9$-clock period and fetch_thres$_{t-1}$>0, fetch_thres$_t$=fetch_thres$_{t-1}$−1; and if the fetching threshold is increased in the previous $10^9$-clock period, fetch_thres$_t$=fetch_thres$_{t-1}$+1; Otherwise benefiet$_t$<benefiet$_{t-1}$, use a threshold adjusting method opposite to that of the previous $10^9$-clock period.

4-2-3) Update benefiet$_{t-1}$ to be benefiet$_t$.

Figure 8:
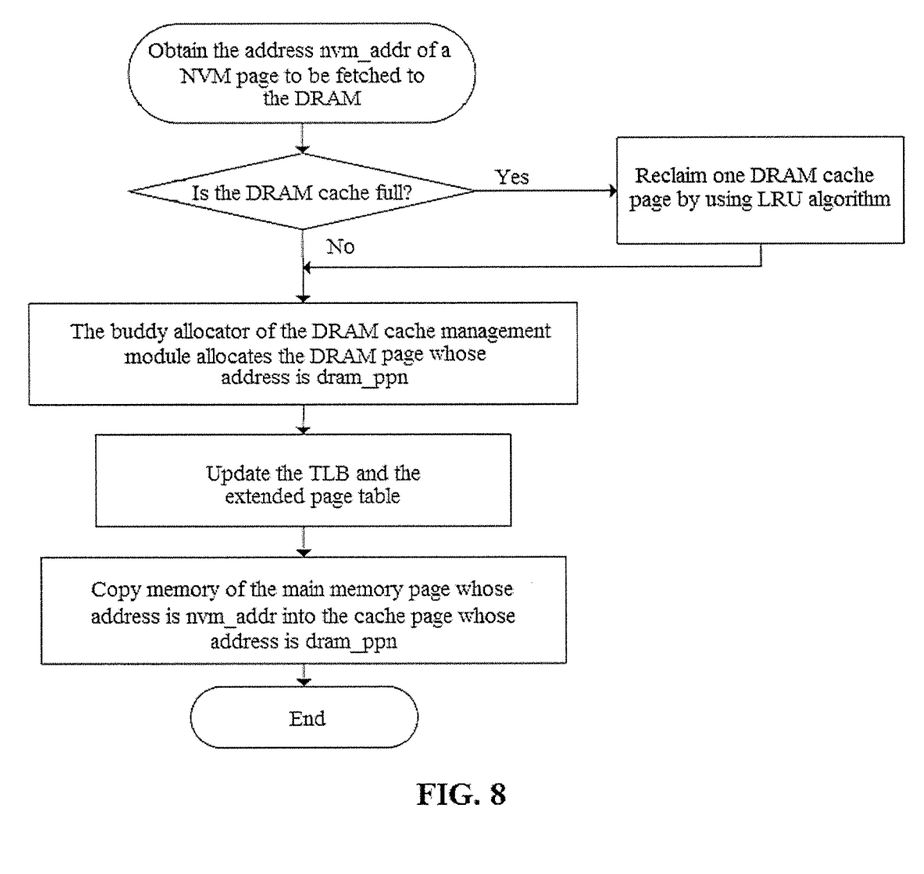
FIG. 8 is a flow chart of prefetching an NVM page to a DRAM cache in a DRAM-NVM hierarchical heterogeneous memory system according to the present invention.

Step 5: fetch the NVM page corresponding to the virtual address into the DRAM cache, and update the TLB and the extended page table. As shown in FIG. 8, this step mainly includes the following sub-steps:

(5-1) If the DRAM cache is full, LRU algorithm is used to determine which DRAM cache page can be reclaimed. If the cached page is dirty, look up the extended page table to obtain the physical address of the NVM memory page corresponding to the DRAM page, and then write the modified DRAM page back to its corresponding NVM page, set the P flag of the TLB entry corresponding to the DRAM page to 0, and set the PD flag of the extended page table entry as 0 (indicating that the physical page corresponding to the virtual page is now in the NVM main memory); If the DRAM cache is not full, go to step (5-2).

(5-2) Call the buddy allocator of the DRAM cache management module to allocate an free DRAM page, and assume the address of the free DRAM page is dram_ppn.

(5-3) Set up the mapping from the NVM page to the DRAM cache page in the extended page table and the TLB. That is, set the overlap field of the extended page table as dram_ppn, and set the PD flag of the extended page table as 1; and set the overlap tlb field of the TLB as dram_ppn, and set the P flag of the TLB as 1.

(5-4) Call the memory controller to copy the NVM page to the corresponding DRAM page.

Step 6: Memory access: access the memory according to an address transmitted into the memory controller.

In the present invention, a DRAM/NVM hierarchical heterogeneous memory system with software-hardware cooperative management scheme is designed. By extending the last-level page table and TLB, step 1 and step 5 eliminate hardware costs in a conventional hardware-managed DRAM/NVM hierarchical memory systems and reduce memory access latency in case of a last-level cache miss. DRAM cache management is pushed to the software level, and thus improve the flexibility of the DRAM/NVM hierarchical heterogeneous memory systems. Considering that applications with poor data locality would cause severe cache pollution, this invention adopts an utility-based data caching algorithm to filter the DRAM cache, as described in step 3 and step 4. It improves efficiency of the DRAM cache and bandwidth usage from the NVM memory to the DRAM cache.

Aspects:

The following numbered aspects provide further disclosure of the invention. It is noted that any of aspects 1-4 below can be combined with any of aspects 5-8.

1. A DRAM/NVM hierarchical heterogeneous memory access method with software-hardware cooperative management scheme, comprising the following steps:

step 1: address translation in TLB: acquiring the physical page number (ppn), the P flag, and content of the overlap TLB field from an TLB entry which corresponds to a virtual page number (vpn), and translating the virtual address into an NVM physical address according to the ppn;

step 2: determining whether memory access is hit in an on-chip cache; directly fetching, by a CPU, a requested data block from the on-chip cache if the memory access is hit, and ending a memory access process; otherwise, turning to step 3;

step 3: determining the storage medium of memory access according to the P flag acquired in step 1; if P is 0, this indicates an NVM page access, and go to step 4, updating information of the overlap tlb field (where the field is used as a counter in this case) in the TLB entry, and determining, according to the fetching threshold in the dynamic threshold adjustment algorithm and the overlap tlb field acquired in step 1, whether to fetch the NVM physical page corresponding to the virtual page into the DRAM cache. Otherwise, if P is 1, which indicates a DRAM page access and the cache is hit, and then the physical address of the to-be-accessed DRAM cache is obtained according to the overlap TLB field acquired in step 1 and the offset of virtual address, and go to step 6 to access the DRAM cache;

step 4: looking up the TLB for an entry corresponding to an NVM main memory page if the value of the overlap TLB field acquired in step 1 is less than the fetching threshold, and increasing the value of overlap tlb field (where the field is used as a counter in this case) in the TLB by one, turning to step 6 to directly access the NVM memory, where the fetching threshold is determined by a fetching threshold runtime adjustment algorithm; turning to step 5 to fetch the NVM main memory page into the DRAM if the value of the overlap TLB field acquired in step 1 is larger than the fetching threshold;

step 5: fetching the NVM page corresponding to the virtual address into the DRAM cache, and updating the TLB and the extended page table; and step 6: memory access: accessing the memory according to an address transmitted into a memory controller.

2. The method according to aspect 1, wherein step 4 comprises the following sub-steps:

(4-1) acquiring, by a memory monitoring module, the number of prefetching times $n_{fetch}$, the number of cache read times $n_{dram\_read}$, and the number of cache write times $n_{dram\_write}$ from the memory controller, wherein in the system, the average read and write latencies of the NVM are $t_{nvm\_read}$ and $t_{nvm\_write}$, respectively, the average read and write latencies of the DRAM are $t_{dram\_read}$ and $t_{dram\_write}$, respectively, and the overhead of caching a DRAM page is $t_{fetch}$. Formula 4.1 calculates the system performance gain benefited from caching NVM page to DRAM in every $10^9$ clocks:

$$\text{benefit}_t = n_{dram\_read} \times (t_{nvm\_read} - t_{dram\_read}) + n_{dram\_write} \times (t_{nvm\_write} - t_{dram\_write}) - n_{fetch} \times t_{fetch} \quad \text{(Formula 4.1)}$$

(4-2) Assuming that the initial fetching threshold is fetch_thres$_0$ (fetch_thres$_0 \geq 0$), the fetching threshold and performance gain in the previous $10^9$-clock period are fetch_thres$_{t-1}$ and benefiet$_{t-1}$, respectively, and the fetching threshold and the performance gain of current $10^9$-clock period are fetch_thres$_t$ and benefiet$_t$, respectively, and the cache utilization is dram_usage. If dram_usage>30%, the hill climbing algorithm is adopted to adjust the fetching threshold.

3. The method according to aspect 2, wherein the adjusting the prefetching threshold by using a hill climbing algorithm in step (4-2) comprises the following sub-steps:

4-2-1) If it is the first time adjusting the threshold, calculate the performance gain under the given fetching threshold. If benefiet$_t \geq 0$, it indicates that data block fetching can improve system performance, and if fetch_thres$_0$>0, fetch_thres$_t$=fetch_thres$_0$−1; otherwise benefiet$_t$<0, it indicates that data block fetching may decrease system performance, fetch_thres$_t$=fetch_thres$_0$+1. If it is not the first time adjusting the threshold, go to the next step;

4-2-2) benefit$_t$>benefit$_{t-1}$, it indicates that the fetching threshold adjusting method used in the previous $10^9$-clock period is able to improve the system performance, and the threshold adjusting method is kept the same as the action in the previous $10^9$-clock period. That is, if the fetching threshold is decreased in the previous $10^9$-clock period and fetch_thres$_{t-1}$>0, fetch_thres$_t$=fetch_thres$_{t-1}$−1; and if the fetching threshold is increased in the previous $10^9$-clock period, fetch_thres$_t$=fetch_thres$_{t-1}$+1; Otherwise benefit$_t$<benefit$_{t-1}$, use a threshold adjusting method opposite to that of the previous $10^9$-clock period; and 4-2-3) updating benefiet$_{t-1}$ to be benefiet$_t$.

4. The method according to aspect 1 or 2, wherein step 5 comprises the following sub-steps:

(5-1) determining, by using an LRU algorithm, the address of a DRAM cache page to be reclaimed if the DRAM cache is full, and looking up the extended page table to obtain an address of an NVM memory page corresponding to the DRAM page if the cache page is written and dirty, writing modified cache page content back to a corresponding NVM main memory, setting a P flag of a TLB entry corresponding to the DRAM page as 0, and setting a PD flag of an entry of the extended page table as 0; or turning to step (5-2) if the DRAM cache is not full;

(5-2) calling the buddy allocator of the DRAM cache management module to allocate an free DRAM page, and assume the address of the free DRAM page is dram_ppn.

(5-3) setting up the mapping from the NVM page to the DRAM cache page in the extended page table and the TLB. That is, set the overlap field of the extended page table as dram_ppn, and set the PD flag of the extended page table as 1; and set the overlap tlb field of the TLB as dram_ppn, and set the P flag of the TLB as 1.

(5-4) calling the memory controller to copy the NVM page to the corresponding DRAM page.

5. A DRAM/NVM hierarchical heterogeneous memory system with software-hardware cooperative management scheme, comprising modified TLB layout, extended page table, and utility-based data fetching module. The significant features include:

the modified TLB is used to cache the address mapping of virtual-to-NVM and also virtual-to-DRAM. This mechanism improves the efficiency of address translation. In addition, some reserved bits in TLB is further used to record page access frequency of applications, so as to assist the utility-based data fetching module for decision making;

the extended page table stores all mapping from virtual pages to physical pages and mapping from NVM pages to DRAM cache pages, where a PD flag is used to indicate the type of a page frame recorded in a page table entry; and the utility-based data fetching module is used to replace the demand-based data fetching policy in a conventional hardware-managed cache. The module mainly includes three sub-modules: a memory monitoring module, a fetching threshold runtime adjustment module, and a data prefetcher: (1) the memory monitoring module is used to acquire DRAM cache utilization and NVM page access frequency from the modified TLB and memory controller, and use them as input information for data fetching threshold runtime adjustment module; (2) the fetching threshold runtime adjustment module is used to dynamically adjust the data fetching threshold according to the runtime information provided by the memory monitoring module, to improve DRAM cache utilization and bandwidth usage between the NVM and the DRAM; (3) the data prefetcher is used to: ① trigger a buddy allocator of the DRAM cache management module to allocate a DRAM page for caching a NVM memory page; ② copy content of the NVM memory page to the DRAM page allocated by the buddy allocator; and ③ update the extended page table and the TLB.

6. The DRAM/NVM hierarchical heterogeneous memory system with software-hardware cooperative management according to aspect 5, wherein the data structures of the last-level page table entry and the TLB entry are modified, and the mapping from virtual pages to physical pages and the mapping from NVM memory pages to DRAM cache pages are uniformly managed, which improves an access speed while ensuring the correctness of cache access and reclaiming, and eliminates hardware overheads of a conventional hardware-managed DRAM/NVM hierarchical memory systems.

7. The DRAM-NVM hierarchical heterogeneous memory system with software-hardware cooperative management according to aspect 5 or 6, wherein an overlap tlb field is designed by using some reserved bits of the TLB entry, and this field is fully utilized to monitor the page access frequency or record the DRAM page number corresponding to an NVM page.

8. The DRAM-NVM hierarchical heterogeneous memory system with software-hardware cooperative management according to aspect 5 or 6, wherein the monitoring module of the utility-based data fetching module acquires the information of page access frequency and cache utilization from TLB and memory controller; and the fetching threshold is dynamically adjusted by using a fetching threshold runtime adjustment algorithm, to improve cache efficiency and bandwidth usage between the NVM memory and the DRAM cache.

Practitioners in this field can easily understand this invention. The descriptions in the above are only preferred embodiments of the presented invention, but are not intended to limit the presented invention. Any modification, equivalent replacement and improvement made within the rationale and principle of the presented invention shall fall within the protection scope of the presented invention.

The invention claimed is:

1. A Dynamic Random Access Memory/Non-Volatile Memory (DRAM/NVM) hierarchical heterogeneous memory access system with software-hardware cooperative management configured to perform the following steps:
   step 1: Translation Lookaside Buffer (TLB) address translation: acquiring a physical page number (ppn), a P flag, and content of an overlap tlb field of an entry where a virtual page is located, and translating a virtual address into an NVM physical address according to the ppn;
   step 2: determining whether memory access is hit in an on-chip cache; directly fetching, by a Central Processing Unit (CPU), a requested data block from the on-chip cache if the memory access is hit, and ending a memory access process; otherwise, turning to step 3;
   step 3: determining a memory access type according to the P flag acquired in step 1; if P is 0, which indicates access to an NVM, turning to step 4, updating information of the overlap tlb field in a TLB table, and determining, according to an automatically adjusted prefetching threshold in a dynamic threshold adjustment algorithm and the overlap tlb field acquired in step 1, whether to prefetch an NVM physical page corresponding to the virtual page into a DRAM cache; or if P is 1, which indicates access to a DRAM cache and indicates that the DRAM cache is hit, calculating an address of the DRAM cache to be accessed according to the information of the overlap tlb field acquired in step 1 and a physical address offset, and turning to step 6 to access the DRAM cache;
   step 4: looking up a TLB entry corresponding to an NVM main memory page if a value of the overlap tlb field acquired in step 1 is less than the automatically adjusted prefetching threshold, and increasing the overlap tlb field of the TLB by one, wherein the overlap tlb field is a counter; turning to step 5 if the value of the overlap tlb field acquired in step 1 is greater than the automatically adjusted prefetching threshold, to prefetch the NVM main memory page into the DRAM cache; otherwise, turning to step 6 to directly access the NVM, wherein the automatically adjusted prefetching threshold is determined by a prefetching threshold runtime adjustment algorithm;
   step 5: prefetching the NVM physical page corresponding to the virtual address into the DRAM cache, and updating the TLB and an extended page table; and
   step 6: memory access: accessing the memory according to an address transmitted into a memory controller.

2. The system according to claim 1, wherein step 4 comprises the following sub-steps:
   (4-1) acquiring, by a memory monitoring module, a number of prefetching times $n_{fetch}$, a number of cache read times $n_{dram\_read}$, and a number of cache write times $n_{dram\_write}$ from the memory controller, wherein in the system, assuming average read and write delays of the NVM are $t_{nvm\_read}$ and $t_{nvm\_write}$, respectively, average read and write delays of the DRAM cache are $t_{dram\_read}$ and $t_{dram\_write}$, respectively, and an overhead of fetching DRAM page is $t_{fetch}$, and calculating, every $10^9$ clocks by using: benefit=$n_{dram\_read} \times (t_{nvm\_read} - t_{dram\_read}) + n_{dram\_write} \times (t_{nvm\_write} - t_{dram\_write}) - n_{fetch} \times t_{fetch}$, a performance benefit of the system brought about by memory page prefetching;
   (4-2) assuming that an initial prefetching threshold is fetch_thres$_0$ (fetch_thres$_0 \geq 0$), the prefetching threshold and a performance benefit of a previous $10^9$-clock period are fetch_thres$_{t-1}$ and benefit$_{t-1}$ respectively, the prefetching threshold and a performance benefit of a current $10^9$-clock period are fetch_thres$_t$ and benefit$_t$, respectively, and a cache usage is dram_usage, adjusting the prefetching threshold by using a hill climbing algorithm if dram_usage>30%.

3. The system according to claim 2, wherein the adjusting the prefetching threshold by using a hill climbing algorithm in step (4-2) comprises the following sub-steps:
   4-2-1) if the prefetching threshold is adjusted for a first time: if benefit$_t \geq 0$, it indicates that data block prefetching can improve system performance, and when fetch_thres$_0 > 0$, fetch_thres$_t$=fetch_thres$_0 - 1$; if benefit$_t < 0$, it indicates that data block prefetching will decrease the system performance, and fetch_thres$_t$=fetch_thres$_0 + 1$; otherwise, turning to the next step;
   4-2-2) if benefit$_t >$ benefit$_{t-1}$, it indicates that a prefetching threshold adjusting method used in the previous $10^9$-clock period helps improve the system performance, and a threshold adjusting method remains the same as the threshold adjusting method in the previous $10^9$-clock period, that is, if the prefetching threshold is decreased in the previous $10^9$-clock period and fetch_thres$_{t-1} > 0$, fetch_thres$_t$=fetch_thres$_{t-1} - 1$; and if the prefetching threshold is increased in the previous $10^9$-clock period, fetch_thres$_t$=fetch_thres$_{t-1} + 1$; otherwise, using a threshold adjusting method opposite to that of the previous $10^9$-clock period; and
   4-2-3) updating benefit$_{t-1}$ to be benefit$_t$.

4. The system according to claim 1, wherein step 5 comprises the following sub-steps:
- (5-1) determining, by using a least recently used (LRU) algorithm, an address of a DRAM cache page to be reclaimed if the DRAM cache is full, and looking up the extended page table to obtain an address of an NVM page corresponding to the DRAM cache page if the DRAM cache page is written or dirty, writing modified cache page content back to a corresponding NVM, setting the P flag of the TLB entry corresponding to the DRAM page as 0, and setting a PD flag of an extended page table entry as 0; or turning to step (5-2) if the DRAM cache is not full;
- (5-2) calling a buddy allocator in DRAM cache management module to allocate a free DRAM page, and setting an address of the free DRAM page as dram_ppn;
- (5-3) inserting a mapping from the NVM page to the DRAM cache page into the extended page table and the TLB, that is, setting an overlap field of the extended page table as dram_ppn, and the PD flag of the extended page table as 1;
  setting the overlap tlb field of the TLB as dram_ppn, and the P flag of the TLB as 1; and
- (5-4) calling a page copy interface in the memory controller to copy the NVM page into the corresponding DRAM cache page.

5. A Dynamic Random Access Memory/Non-Volatile Memory (DRAM/NVM) hierarchical heterogeneous memory system with software-hardware cooperative management, comprising a modified Translation Lookaside Buffer (TLB) layout, an extended page table, and a utility-based data prefetching module, wherein:
- the modified TLB is configured to cache mappings from some virtual pages to NVM pages and DRAM cache pages, to improve an address translation speed; in addition, reserved bits in the modified TLB is further configured to collect information of application access frequency, to assist the utility-based data prefetching module in data prefetching;
- the extended page table stores all mappings from virtual pages to physical NVM pages and mappings from NVM pages to DRAM cache pages, wherein a PD flag is set, to indicate a type of a page frame recorded in a page table entry; and
- the utility-based data prefetching module is configured to replace a demand-based data prefetching policy in a conventional cache architecture, wherein the utility-based data prefetching module mainly comprises three sub-modules: a memory monitoring module, a prefetching threshold runtime adjustment module, and a data prefetcher: (1) the memory monitoring module is configured to acquire cache utilization and main memory page access frequency information from the modified TLB and a memory controller, and use the cache utilization and the main memory page access frequency information as input information for runtime adjustment of a data prefetching threshold; (2) the prefetching threshold runtime adjustment module is used to dynamically adjust the data prefetching threshold according to runtime information provided by the monitoring module, to improve usage of a DRAM cache and usage of bandwidth between the NVM and the DRAM; (3) the data prefetcher is used to: ① trigger a buddy allocator of the DRAM cache management module to allocate a DRAM cache page for caching an NVM page; ② copy content of the NVM page to the DRAM cache page allocated by the DRAM cache management module; and ③ update the extended page table and the TLB.

6. The DRAM/NVM hierarchical heterogeneous memory system with software-hardware cooperative management according to claim 5, wherein data structures of last-level page table entries and TLB entries are modified, and the mappings from virtual pages to physical pages and the mappings from NVM pages to DRAM cache pages are uniformly managed, which improves a memory access speed while ensuring correctness of cache access and reclaiming, and eliminates hardware overheads of a conventional DRAM/NVM hierarchical heterogeneous memory system.

7. The DRAM/NVM hierarchical heterogeneous memory system with software-hardware cooperative management according to claim 5, wherein an overlap tlb field is formed by using reserved bits of a TLB entry, and the overlap tlb field is fully utilized to monitor the page access frequency information and record a DRAM page number corresponding to an NVM page.

8. The DRAM-NVM hierarchical heterogeneous memory system with software-hardware cooperative management according to claim 5, wherein the memory monitoring module of the utility-based data prefetching module acquires memory page access frequency information and cache utilization information from the TLB and the memory controller; and the data prefetching threshold is dynamically adjusted by using a prefetching threshold runtime adjustment algorithm, to improve cache usage and usage of bandwidth from the NVM to the DRAM cache.

* * * * *